US011892578B2

(12) United States Patent
Fu et al.

(10) Patent No.: US 11,892,578 B2
(45) Date of Patent: Feb. 6, 2024

(54) SEISMIC IMAGING METHOD, SYSTEM, AND DEVICE BASED ON PRE-STACK HIGH-ANGLE FAST FOURIER TRANSFORM

(71) Applicant: China University of Petroleum (EAST CHINA), Qingdao (CN)

(72) Inventors: Liyun Fu, Qingdao (CN); Qingqing Li, Qingdao (CN); Qizhen Du, Qingdao (CN); Zhiwei Wang, Qingdao (CN)

(73) Assignee: China University of Petroleum (EAST CHINA), Qingdao (CN)

( * ) Notice: Subject to any disclaimer, the term of this patent is extended or adjusted under 35 U.S.C. 154(b) by 0 days.

(21) Appl. No.: 17/958,054

(22) Filed: Sep. 30, 2022

(65) Prior Publication Data
US 2023/0034829 A1    Feb. 2, 2023

(30) Foreign Application Priority Data

Apr. 6, 2022    (CN) .......................... 202210353352.X (51) Int. Cl.
*G01V 1/28*    (2006.01)
*G01V 1/36*    (2006.01)

(52) U.S. Cl.
CPC .............. *G01V 1/282* (2013.01); *G01V 1/362* (2013.01); *G01V 2210/512* (2013.01); *G01V 2210/67* (2013.01)

(58) Field of Classification Search
CPC .. G01V 1/282; G01V 1/362; G01V 2210/512; G01V 2210/67

(Continued)

(56) References Cited

U.S. PATENT DOCUMENTS

2010/0110832 A1    5/2010    Valenciano Mavilio et al.
2011/0066404 A1    3/2011    Salazar-Tio et al.
2013/0279293 A1    10/2013   Xu et al.

FOREIGN PATENT DOCUMENTS

CN    102478663 A    5/2012
CN    102540253 A    7/2012
(Continued)

OTHER PUBLICATIONS

English translation of CN 102540253, Jul. 4, 2012. (Year: 2012).*
(Continued)

*Primary Examiner* — Michael P Nghiem (57) ABSTRACT

This disclosure relates to geophysical exploration and seismic imaging, and more particularly to a seismic imaging method, system, and device based on pre-stack high-angle fast Fourier transform (FFT). The method includes: acquiring seismic data acquired during seismic exploration; extracting a common shot point gather from the seismic data followed by conversion into a frequency wavenumber domain common offset gather; calculating wave propagation angles; dividing an imaging region into a first region and a second region; solving constant coefficients of the first region and the second region; performing frequency-division layer-by-layer wavefield continuation on a frequency-wave number domain common offset gather to obtain imaging results at different depths and frequencies; subjecting the imaging results to integration followed by transformation to a spatial domain to obtain common offset imaging profiles; and subjecting the common offset imaging profiles to superposition obtain final imaging results. The disclosure achieves the highly-precise seismic imaging of high-steep structures and improves imaging efficiency.

4 Claims, 8 Drawing Sheets

(58) Field of Classification Search
USPC .......................................................... 702/14
See application file for complete search history.

(56) References Cited

FOREIGN PATENT DOCUMENTS

| CN | 106338766 A | 1/2017 |
| CN | 107390269 A | 11/2017 |
| CN | 111077567 A | 4/2020 |
| CN | 114428324 B * | 6/2022 ............. G01V 1/282 |

OTHER PUBLICATIONS

English translation of CN 114428324, Jun. 2022. (Year: 2022).*
Fu, Liyun et al., Degenerate migrators for imaging fault-related complex structures, Chinese Journal of Geophysics, vol. 50, issue 4, Jul. 2007, pp. 1242-1248; State Key Laboratory of Lithospheric Evolution, Institute of Geology and Geophysics, Chinese Academy of Sciences, Bejing 100029, China.
Huang, Lian-Jie et al., Extended local Born Fourier migration method. Geophysics, 64(5), pp. 1524-1534.

* cited by examiner

SEISMIC IMAGING METHOD, SYSTEM, AND DEVICE BASED ON PRE-STACK HIGH-ANGLE FAST FOURIER TRANSFORM

CROSS-REFERENCE TO RELATED APPLICATIONS

This application claims the benefit of priority from Chinese Patent Application No. 202210353352.X, filed on Apr. 6, 2022. The content of the aforementioned application, including any intervening amendments thereto, is incorporated herein by reference in its entirety.

TECHNICAL FIELD

This application relates to geophysical exploration and seismic imaging, and more particularly to a seismic imaging method, system, and device based on pre-stack high-angle fast Fourier transform (FFT).

BACKGROUND

As the exploration progresses, extremely complex fault-block reservoirs, strike-slip fault reservoirs, and fractured buried-hill reservoirs have become new challenges in oil and gas exploration. Seismic reflections generated by the corresponding high-steep fault-block structures, high-steep strike-slip fault structures, and fractured buried-hill structures have characteristics of high angle and weak amplitude. The traditional seismic imaging method based on the first-order based Born-approximation split-step Fourier (SSF) transform is only applicable to strata with a low angle (lower than 15°), and can no longer meet the needs of current geological exploration. Although the emerging high-accuracy imaging techniques such as the two-way wave-based least-squares reverse-time migration (LSRTM) can effectively improve the imaging quality of high-angle structures, they struggle with extremely low computational efficiency and high dependence on the accuracy of velocity models, and thus are not suitable for the industrial application. Therefore, it is urgently needed to develop a fast and high-accuracy seismic imaging technique for complex structures (such as high-angle strata).

SUMMARY

An object of the present disclosure is to provide a seismic imaging method, system, and device based on pre-stack high-angle fast Fourier transform (FFT) to overcome the deficiencies in the existing seismic imaging method when used for high-angle structures (high-angle strata), i.e., low imaging quality, poor efficiency and high dependence on the accuracy of velocity models.

Technical solutions of the present disclosure are described as follows.

In a first aspect, the present disclosure provides a seismic imaging method based on pre-stack high-angle fast Fourier transform (FFT), comprising:

(S100) acquiring seismic data collected during seismic exploration, wherein the seismic data comprises seismic source type, seismic source dominant frequency, location of a shot point, maximum tectonic angle, a set temporal sampling interval, a size of a given velocity model, and spatial interval;

(S200) converting a common shot point gather to a common offset gather as a time-space domain common offset gather according to coordinates of the shot point and a receiver point in the seismic data; and converting time-space domain common offset seismic data in the time-space domain common offset gather from time-space domain to frequency-wavenumber domain by using Fourier transform to obtain frequency-wavenumber domain common offset seismic data;

(S300) calculating wave propagation angles of the grid points of the given velocity model at different frequencies based on the frequency wavenumber domain common offset seismic data; and dividing an imaging region into a first region and a second region based on the wave propagation angles, wherein a wave propagation angle of the first region is smaller than that of the second region;

(S400) solving optimized constant coefficients separately corresponding to the first region and the second region through a preset improved random walk algorithm; and acquiring optimized rational constant coefficients a, b, and c by solving a minimum of an objective function;

(S500) substituting the optimized rational constant coefficients into a frequency-wavenumber domain wavefield continuation equation; and performing frequency-division layer-by-layer wavefield continuation on a frequency-wavenumber domain common offset gather to obtain imaging results at different depths and frequencies;

(S600) subjecting the imaging results at different depths and frequencies to integration to obtain integrated imaging results; and transforming the integrated imaging results to a spatial domain by using inverse Fourier transform to obtain common offset imaging profiles; and (S700) subjecting the common offset imaging profiles to superposition to obtain final imaging results.

In some embodiments, in step (S300), the imaging region is divided through steps of:

acquiring the wave propagation angles according to partial derivatives of a seismic wavefield in x and z directions;

wherein if a wave propagation angle is less than a set angle threshold, a corresponding seismic imaging region is classified as the first region, otherwise, classified as the second region.

In some embodiments, the rational constant coefficients are calculated based on the preset improved random walk algorithm through the following equation:

$$J = \int_0^1 \int_0^\varphi \left( \sqrt{1-\bar{k}_x^2} + n - 1 + (n-1)\frac{c\bar{k}_x^2}{a+b\bar{k}_x^2} - \sqrt{n^2 - \bar{k}_x^2} \right)^2 d\theta dn;$$

wherein J is an objective function; $\theta$ represents wave propagation angle; n is the medium refractive index; a, b and c represent rational constant coefficients; $k_x$ represents the wavenumber in x direction; $\bar{k}_x$ represents normalized wavenumber in x direction, and $\bar{k}_x = k_x/k_0$; $k_0$ represents the wavenumber based on the background velocity; and $\varphi$ is a set maximum imaging angle.

In some embodiments, the frequency-wavenumber domain wavefield continuation equation is constructed through steps of:

constructing a rational function-approximation dispersion relation based on heterogeneity of a real underground medium; and substituting the rational function-approximation dispersion relation into a frequency-wavenumber domain Fourier wavefield continuation fundamental equation to obtain the frequency-wavenumber domain wavefield continuation equation, expressed as:

$$P(k_x, z + \Delta z) = \left\{ \begin{array}{c} (1-\alpha)\exp[ik_0\Delta z(n-1)] + \\ \alpha\exp[ik_0\Delta z(2n-2)] \end{array} \right\} p(k_x, z)\exp(ik_z\Delta z);$$

wherein $P(k_x,z+\Delta z)$ represents wavefield information at a depth of $z+\Delta z$; $k_z$ represents the wavenumber in z direction; $p(k_x,z)$ represents wavefield information at a depth of z; $\alpha$ is an intermediate parameter variable, and $$\alpha = \frac{\overline{ck_x^2}}{a + \overline{bk_x^2}};$$

i represents an imaginary number; $\Delta Z$ represents a spatial sampling interval along a depth direction; n represents a medium refractive index; $k_x$ represents the wavenumber in x direction; and $k_0$ is the wavenumber based on the background velocity;

In some embodiments, the rational function-approximation dispersion relation is expressed as:

$$\overline{k_z} = \sqrt{1 - \overline{k_x^2}} + (n-1) + (n-1)\left(\frac{c\overline{k_x}^2}{a + b\overline{k_x}^2}\right);$$

wherein $\overline{k_z}$ represents normalized wavenumber in z direction.

In a second aspect, the present disclosure provides a seismic imaging system based on pre-stack high-angle fast FFT, wherein the seismic imaging system comprises a seismic data acquisition module, a conversion module, an angle-based region division module, a constant coefficient solution module, a wavefield continuation module, an inverse transform module, and a profile superposition module;

wherein the seismic data acquisition module is configured to acquire seismic data collected during seismic exploration, wherein the seismic data comprises seismic source type, seismic source dominant frequency, location of a shot point, maximum tectonic angle, a set temporal sampling interval, a size of a given velocity model, and a spatial interval;

the conversion module is configured to convert a common shot point gather to a common offset gather as a time-space domain common offset gather according to coordinates of the shot point and a receiver point in the seismic data, and convert time-space domain common offset seismic data in the time-space domain common offset gather from time-space domain to frequency-wavenumber domain by using Fourier transform to obtain frequency wavenumber domain common offset seismic data;

the angle-based region division module is configured to calculate wave propagation angles of the grid points of the given velocity model at different frequencies based on the frequency wavenumber domain common offset seismic data, and divide an imaging region into a first region and a second region based on the wave propagation angles, wherein a wave propagation angle of the first region is smaller than that of the second region;

the constant coefficient solution module is configured to solve optimized constant coefficients separately corresponding to the first region and the second region by a preset improved random walk algorithm, and acquire optimized rational constant coefficient a, b, and c by solving a minimum of an objective function;

the wavefield continuation module is configured to substitute the optimized rational constant coefficients into a frequency wavenumber domain wavefield continuation equation, and perform frequency-division layer-by-layer wavefield continuation for a frequency wavenumber domain common offset gather to obtain imaging results at different depths and frequencies;

the inverse transform module is configured to integrate the imaging results at different depths and frequencies to obtain integrated imaging results, and transform the integrated imaging results to a spatial domain by using inverse Fourier transform to obtain common offset imaging profiles; and the profile superposition module is configured to perform superposition on the common offset imaging profiles to obtain final imaging results.

In a third aspect, the present disclosure provides a seismic imaging device based on pre-stack high-angle fast FFT, comprising:
at least one processor; and
a memory in communication connection with the at least one processor;
wherein the memory is configured to store an instruction executable by the at least one processor; and the instruction is configured to be executed by the at least one processor to implement the seismic imaging method based on pre-stack high-angle fast FFT.

In a fourth aspect, the present disclosure provides a computer-readable storage medium, wherein the computer-readable storage medium stores a computer instruction; and the computer instruction is configured to be executed by a computer to implement the seismic imaging method based on pre-stack high-angle fast FFT.

Compared to the prior art, the present disclosure has the following beneficial effects.

The present disclosure achieves the highly-precise seismic imaging of high-steep structures and improves imaging efficiency.

(1) By obtaining the high-angle rational Fourier transform imaging operator (i.e., high-angle offset operator) and introducing it into the frequency wavenumber domain wavefield continuation equation, and performing frequency-division layer-by-layer wavefield continuation on the frequency wavenumber domain common offset gather to obtain imaging results at different frequencies and depths, which achieves the highly-precise seismic imaging of high-steep structures with imaging angles up to 60°, much higher than the traditional split-step Fourier (SSF)-based seismic imaging methods.

(2) The seismic imaging method provided herein can be applied to the common offset gather with high computational efficiency, which can be used for industrial practical application and is also widely used in the geophysical seismic imaging related to the survey industry.

BRIEF DESCRIPTION OF THE DRAWINGS

Features, objects and advantages of the present application will become more apparent through the detailed description of non-limiting embodiments made with reference to the following accompanying drawings.

DETAILED DESCRIPTION OF EMBODIMENTS

To make the objects, technical solutions, and advantages of the present disclosure clearer, the technical solutions in the embodiments of the present disclosure will be clearly and completely described below with reference to the accompanying drawings. Described below are only some embodiments of the present disclosure and are not intended to limit the disclosure. Based on the embodiments in the present disclosure, all other embodiments obtained by one of ordinary skill in the art without paying creative work shall fall within the scope of the present disclosure.

The present disclosure will be described in detail below with reference to the accompanying drawings and embodiments. It should be understood that the embodiments described herein are merely illustrative and not intended to limit this application. It is also to be noted that the accompanying drawings merely illustrate those parts related to this application for the convenience of description.

It is to be noted that the embodiments of the present application and the features in the embodiments can be combined in the case of no contradiction.

Figure 1:
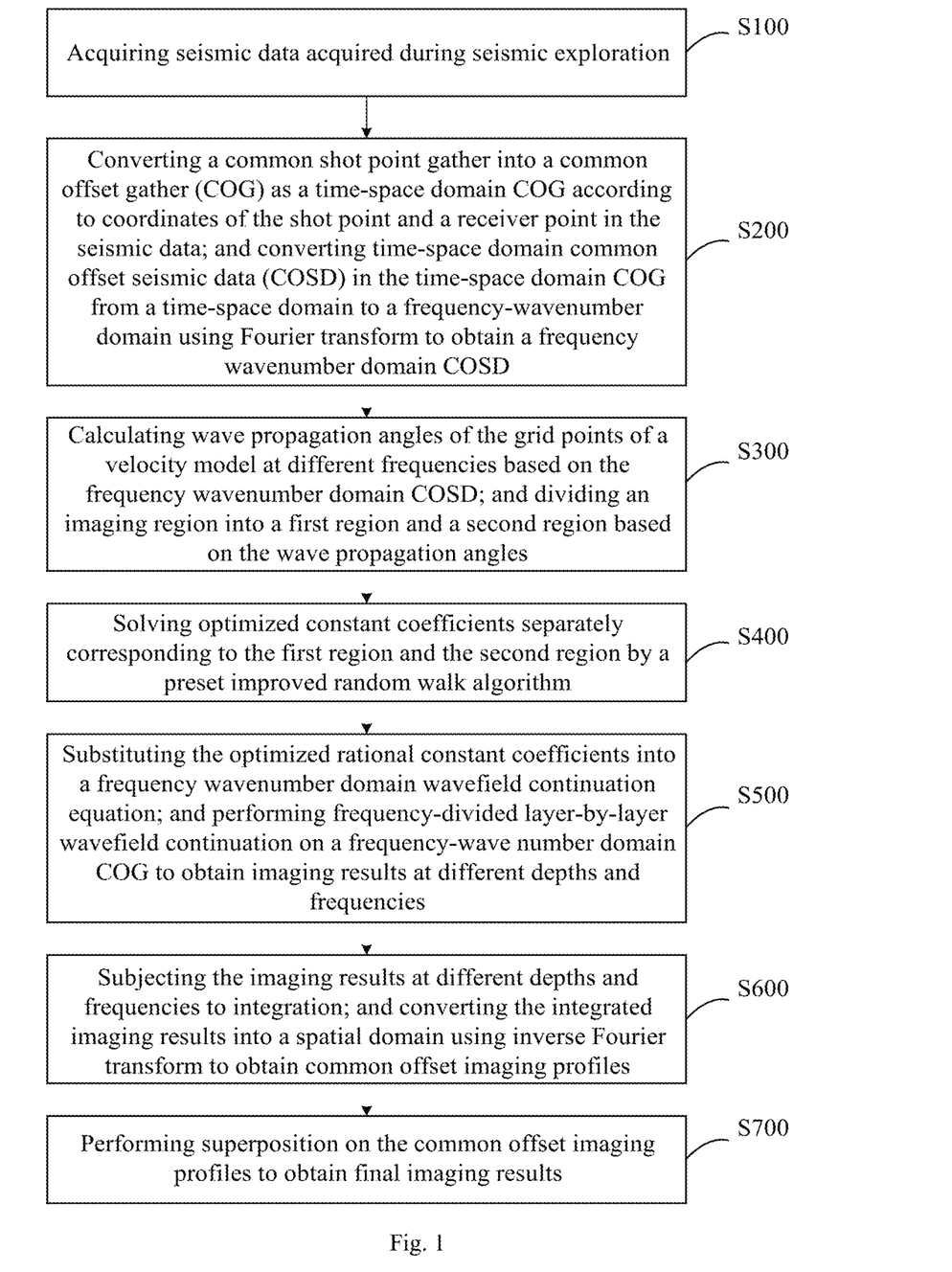
FIG. 1 is a flow chart of a seismic imaging method based on pre-stack high-angle fast Fourier transform (FFT) according to an embodiment of the present disclosure.

Referring to FIG. 1, a seismic imaging method based on pre-stack high-angle fast Fourier transform (FFT) is provided, which includes the following steps.

(S100) Seismic data collected during seismic exploration is acquired, where the seismic data includes seismic source type, seismic source dominant frequency, location of a shot point, maximum tectonic angle, a set temporal sampling interval, a size of a given velocity model, and a spatial interval.

(S200) A common shot point gather is converted to a common offset gather as a time-space domain common offset gather according to coordinates of the shot point and a receiver point in the seismic data. Time-space domain common offset seismic data in the time-space domain common offset gather is converted from time-space domain to frequency-wavenumber domain by using Fourier transform to obtain frequency-wavenumber domain common offset seismic data.

(S300) Wave propagation angles of the grid points of the given velocity model at different frequencies are calculated based on the frequency-wavenumber domain common offset seismic data. An imaging region is divided into a first region and a second region based on the seismic wave propagation angles, where a wave propagation angle of the first region is smaller than that of the second region.

(S400) Optimized constant coefficients separately corresponding to the first region and the second region are solved by a preset improved random walk algorithm.

(S500) The optimized rational constant coefficients are substituted into a frequency-wavenumber domain wavefield continuation equation. Frequency-division layer-by-layer wavefield continuation is performed on a frequency-wavenumber domain common offset gather to obtain imaging results at different depths and frequencies.

(S600) The imaging results at different depths and frequencies are subjected to integration to obtain integrated imaging results. The integrated imaging results are transformed to a spatial domain by using inverse Fourier transform to obtain common offset imaging profiles.

(S700) The common offset imaging profiles are subjected to superposition to obtain final imaging results.

Figure 3:
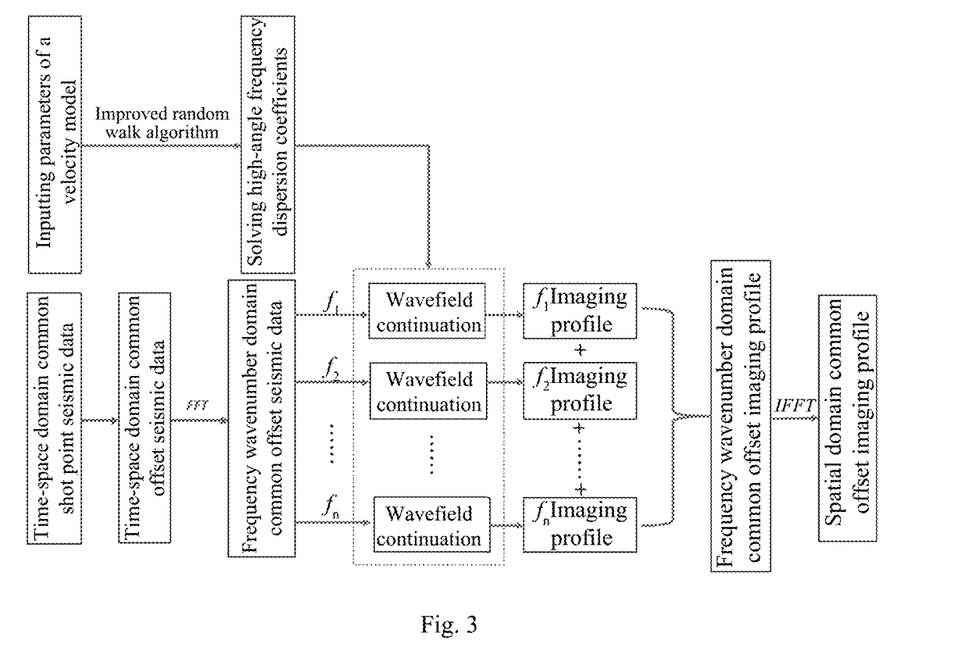
FIG. 3 is a simplified schematic diagram of the seismic imaging method according to an embodiment of the present disclosure.

To more clearly explain the seismic imaging method based on pre-stack high-angle FFT, the procedures will be described in detail below with reference to FIG. 3.

The present disclosure proposes a new two-way FFT seismic imaging technique based on rational approximation, which is implemented in the frequency-wavenumber domain and differs from the traditional one-way FFT seismic imaging technique based on Born approximation. The seismic imaging method realizes the high-angle approximation of two-way waves, and thus obtaining the high-angle rational Fourier transform imaging operator, which is introduced into the wavefield continuation formula to realize the high-accuracy imaging of high-steep structures. The specific procedures of the seismic imaging provided in an embodiment are as follows.

(S100) Seismic data collected during seismic exploration is acquired, where the seismic data includes seismic source type, seismic source dominant frequency, location of a shot point, maximum tectonic angle, a set temporal sampling interval, a size of a given velocity model, and a spatial interval.

Figure 5A:
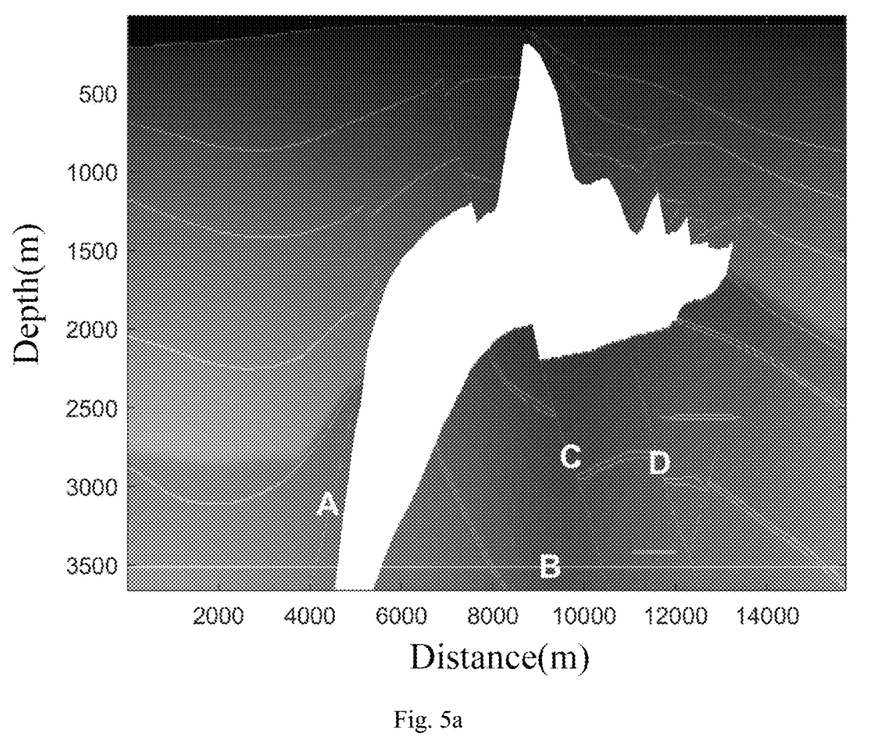
FIG. 5a is a schematic diagram of a SEG (Society of Exploration Geophysicists)/EAEG (European Association of Geoscientists & Engineers) salt dome model according to an embodiment of the present disclosure.

In this embodiment, seismic data collected during seismic exploration is acquired firstly, where the seismic data includes seismic source type, seismic source dominant frequency, location of a shot point, maximum tectonic angle, a set temporal sampling interval, a size of a given velocity model, and a spatial interval. The given velocity model used herein is a SEG/EAEG salt dome model, as shown in FIG. 5a, with a maximum tectonic angle of about 70°, a size of preferably 15000 m×3700 m, and a dominant frequency of 10 Hz.

(S200) A common shot point gather is converted to a common offset gather as a time-space domain common offset gather according to coordinates of the shot point and a receiver point in the seismic data. Time-space domain common offset seismic data in the time-space domain common offset gather is converted from time-space domain to frequency-wavenumber domain by using Fourier transform to obtain a frequency-wavenumber domain common offset seismic data.

In this embodiment, the common shot point gather is extracted from the seismic data acquired by the geophone array, and is converted into a common offset gather as a time-space domain common offset gather. Then the time-space domain common offset seismic data in the time-space domain common offset gather is converted from time-space domain to frequency-wavenumber domain by using Fourier transform (illustrated by FFT in FIG. 3) to obtain a frequency wavenumber domain common offset seismic data $f_1 \ldots f_n$, where $f_n$ represents a cut-off frequency.

(S300) Wave propagation angles of the grid points of the given velocity model at different frequencies are calculated based on the frequency-wavenumber domain common offset seismic data. An imaging region is divided into a first region and a second region based on the seismic wave propagation angles, where a wave propagation angle of the first region is smaller than that of the second region.

In this embodiment, wave propagation angles (namely, propagation angles of the seismic wave) of the grid points of the given velocity model at different frequencies are calculated based on the frequency wavenumber domain common offset seismic data. An imaging region is divided into a first region and a second region based on the seismic wave propagation angles, where a wave propagation angle of the first region is smaller than that of the second region.

To be specific, the wave propagation angles are acquired according to partial derivatives of a seismic wavefield in x and z directions $$\left(\theta = \arctan\left(\left|\frac{\partial p}{\partial x}\right| / \left|\frac{\partial p}{\partial z}\right|\right)\right).$$

If a wave propagation angle is less than a set angle threshold, a corresponding seismic imaging region is classified as the first region, otherwise, classified as the second region.

Figure 5B:
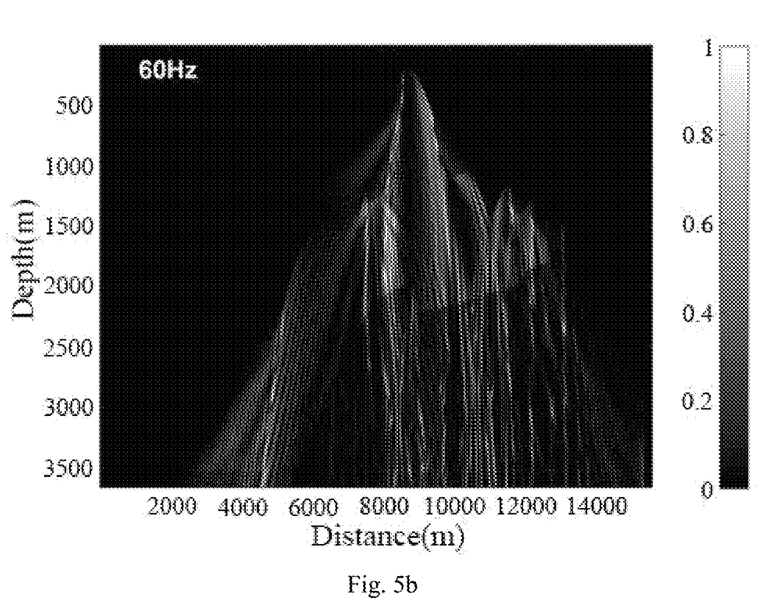
FIG. 5b schematically illustrates a first region and a second region according to an embodiment of the present disclosure.

FIG. 5b schematically illustrates a first region and a second region, in which the black region represents the first region, and the black region represents the second region.

(S400) Optimized constant coefficients separately corresponding to the first region and the second region are solved by a preset improved random walk algorithm.

(S500) The optimized rational constant coefficients are substituted into a frequency-wavenumber domain wavefield continuation equation. Frequency-division layer-by-layer wavefield continuation is performed on a frequency-wavenumber domain common offset gather to obtain imaging results at different depths and frequencies.

In the frequency wavenumber domain, the Fourier wavefield continuation fundamental equation is:

$$P(k_x, z+\Delta z) = \tilde{p}(k_x, z)\exp(ik_z\Delta z) \quad (1);$$

where $k_x$ and $k_z$ represent wavenumber in x direction and wavenumber in z direction, respectively, and $k_x^2 + k_z^2 = k_0^2$; $k_0$ represents the wavenumber based on the background velocity; $P(k_x, z+\Delta z)$ represents wavefield information at a depth of $z+\Delta z$; $\tilde{p}(k_x, z)$ represents a Fourier wavefield at a depth of z; i represents an imaginary number; and $\Delta AZ$ represents a spatial sampling interval along a depth direction; n represents a refractive index of different media. Therefore, wavefield information at different depths can be acquired by formula (1).

Figure 4A:
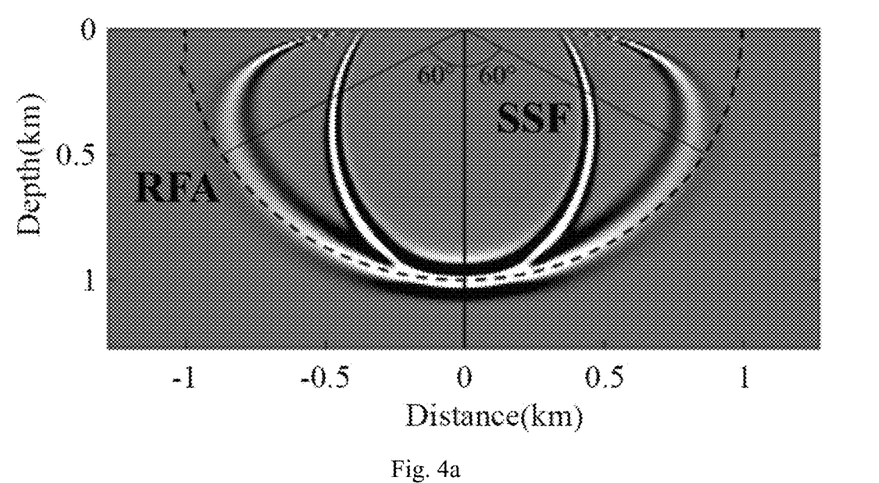
FIG. 4a schematically show snapshot accuracy with respect to a wavefield with a refractive index of 0.3 according to an embodiment of the present disclosure.
Figure 4B:
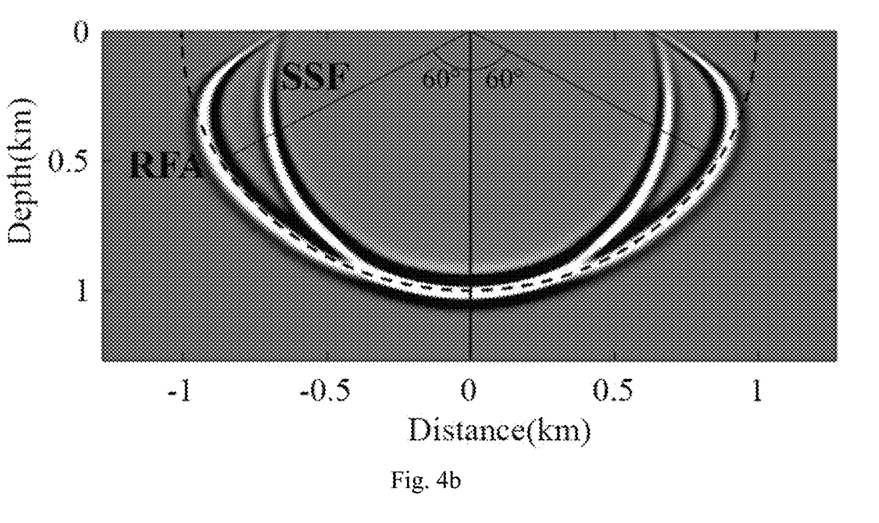
FIG. 4b schematically show snapshot accuracy with respect to a wavefield with a refractive index of 0.6 according to an embodiment of the present disclosure.
Figure 4C:
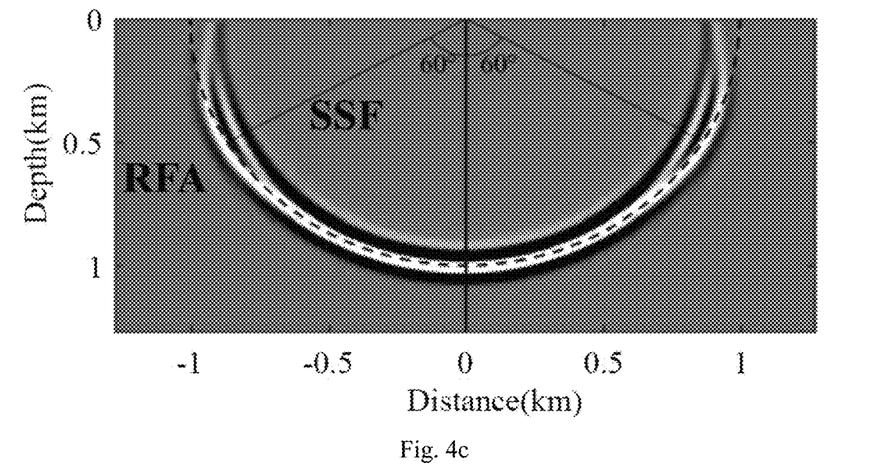
FIG. 4c schematically show snapshot accuracy with respect to a wavefield with a refractive index of 0.9 according to an embodiment of the present disclosure.

Since the real subsurface medium is non-uniform, its wave number dispersion relation can be expressed as:

$$\bar{k}_z = (n - \bar{k}_x^2)/\sqrt{1 - \bar{k}_x^2}; \quad (2)$$

where n is the medium refractive index; $\bar{k}_x = k_x/k_0$; $\bar{k}_z = k_z/k_0$; $\bar{k}_x$ represents normalized wavenumber in x direction, and $\bar{k}_z$ is normalized wavenumber in z direction. It can be seen from formula (2) that the wave number dispersion relationship will produce instability when $\bar{k}_z = 1$. FIG. 4a-4c show the snapshot accuracy of wavefields with refractive indices of 0.3, 0.6, and 0.9, respectively. To solve the problem, the rational function approximation (RFA) dispersion relation is proposed in the present disclosure, expressed as:

$$\bar{k}_z = \sqrt{1 - \bar{k}_x^2} + (n-1) + (n-1)\left(\frac{c\bar{k}_x^2}{a + b\bar{k}_x^2}\right); \quad (3)$$

Formula (3) is substituted into formula (1) to obtain the frequency-wavenumber domain wavefield continuation fundamental equation:

$$P(k_x, z+\Delta z) = \left\{\begin{array}{c}(1-\alpha)\exp[ik_0\Delta z(n-1)] + \\ \alpha\exp[ik_0\Delta z(2n-2)]\end{array}\right\} p(k_x, z)\exp(ik_z\Delta z); \quad (4)$$

where a, b and c represent rational constant coefficients;

$$\alpha = \frac{c\bar{k}_x^2}{a + b\bar{k}_x^2};$$

and $p(k_x, z)$ wavefield information at a depth of z. The least squares function is defined as:

$$J = \int_0^1 \int_0^\varphi \left(\sqrt{1 - \bar{k}_x^2} + n - 1 + (n-1)\frac{c\bar{k}_x^2}{a + b\bar{k}_x^2} - \sqrt{n^2 - \bar{k}_x^2}\right)^2 d\theta dn; \quad (5)$$

where J is an objective function, which is the two-parametric number of the approximate dispersion curve of the present disclosure and the dispersion curve of formula (2); the optimal rational constant coefficients a, b, and c can be obtained by finding the minimum of the objective function; $\theta$ represents a wave propagation angle; and $\varphi$ is a set maximum imaging angle, determined by $\theta$. An improved random walk algorithm is used herein for global optimization search.

In this embodiment, optimized constant coefficients separately corresponding to the first region and the second region are solved by a preset improved random walk algorithm (namely, the rational coefficients are acquired by the improved random walk algorithm). The optimized rational constant coefficients are substituted into a frequency-wavenumber domain wavefield continuation equation to obtain a high-angle offset operator (namely, the content of the curly bracket in formula (4)). Frequency-division layer-by-layer wavefield continuation is performed on a frequency-wavenumber domain common offset gather to obtain imaging results at different depths and frequencies. As for the SEG/EAEG model, the optimized coefficients a, b, and c of the first region are 0.98, 0.118, and −0.618, respectively, and the optimized coefficients a, b, and c of the second region are 0.98, 0.088, and −0.651, respectively.

(S600) The imaging results at different depths and frequencies are subjected to integration to obtain integrated imaging results. The integrated imaging results are transformed to a spatial domain by using inverse Fourier transform to obtain common offset imaging profiles.

In this embodiment, the imaging results at frequencies are integrated and then converted into a spatial domain by using inverse Fourier transform (illustrated by IFFT in FIG. 3) to obtain common offset imaging profiles.

(S700) The common offset imaging profiles are subjected to superposition to obtain final imaging results.

Figure 6A:
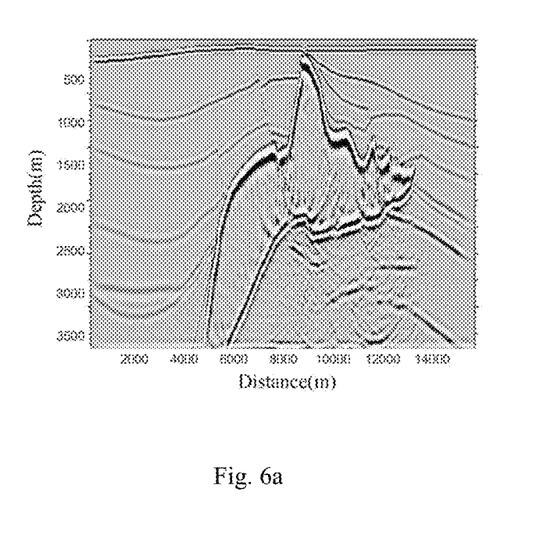
FIG. 6a schematically shows imaging results obtained by a conventional Kirchhoff-based seismic imaging method.
Figure 6B:
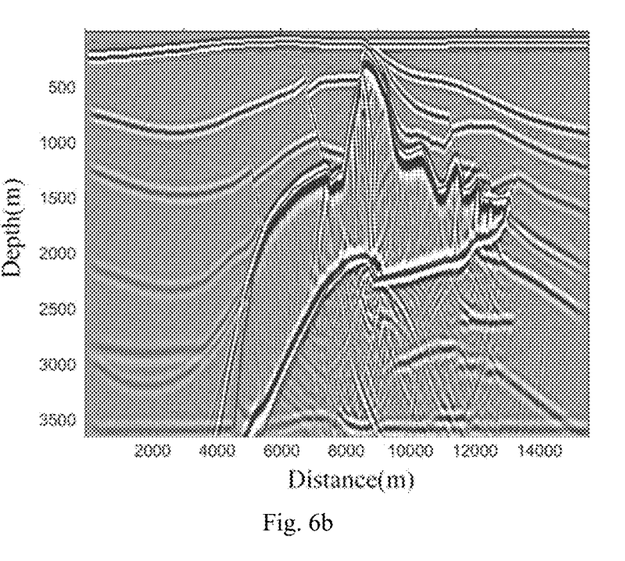
FIG. 6b schematically shows imaging results obtained by a conventional split-step Fourier (SSF)-based seismic imaging method.
Figure 6C:
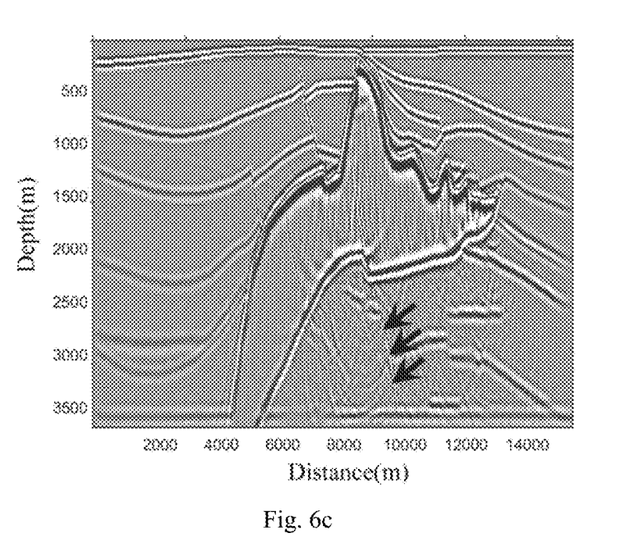
FIG. 6c schematically shows imaging results obtained by the seismic imaging method based on rational function approximation (RFA) according to an embodiment of the present disclosure.

In this embodiment, the common offset imaging profiles are subjected to superposition to obtain final imaging results, as shown in FIG. 6.

In addition, numerical simulation experiments are carried out on the salt dome model to verify that this application can achieve high quality imaging of high-steep structures without increasing the computational effort.

Specifically, the SEG/EAEG salt dome model shown in FIG. 5a is taken as an example. FIGS. 6a-6c show the imaging results of the conventional Kirchhoff technique, the conventional SSF technique, and the RFA technique of the present disclosure, respectively. As evidenced by these figures, the method provided herein can achieve high-resolution imaging for high-angle structures (shown by the arrow in FIG. 6c), while the conventional one-way wave offset imaging technique fails to achieve accurate imaging of high-steep structures.

Figure 7A:
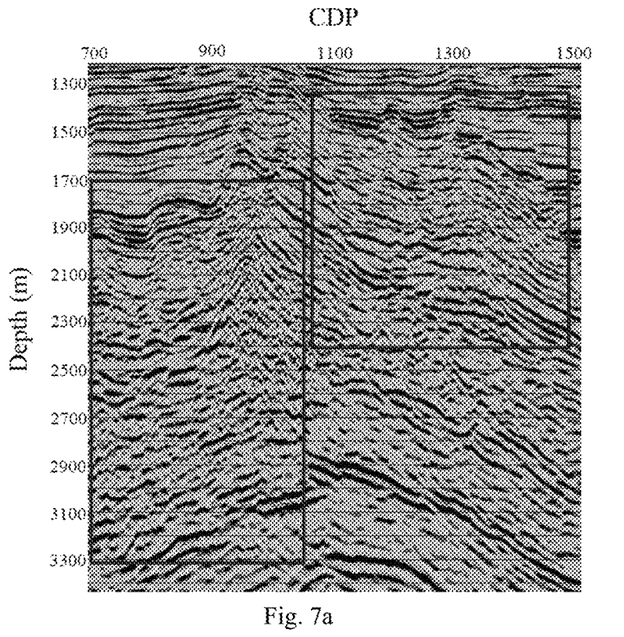
FIG. 7a schematically depicts a profile obtained by the conventional Kirchhoff-based seismic imaging method.
Figure 7B:
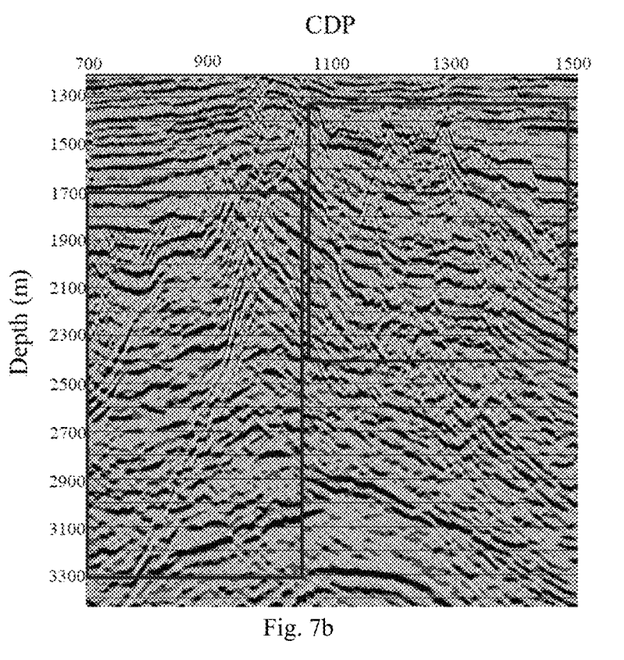
FIG. 7b schematically shows a profile obtained by the seismic imaging method according to an embodiment of the present disclosure.

To further illustrate the technical benefits of the method provided herein, practical data tests are carried out. A comparison between the imaging profile of the method of the present disclosure (as shown in FIG. 7(b)) and that of the conventional Kirchhoff (as shown in FIG. 7(a)) shows that the method of the present disclosure can achieve high-accuracy imaging of high-steep structures.

Figure 2:
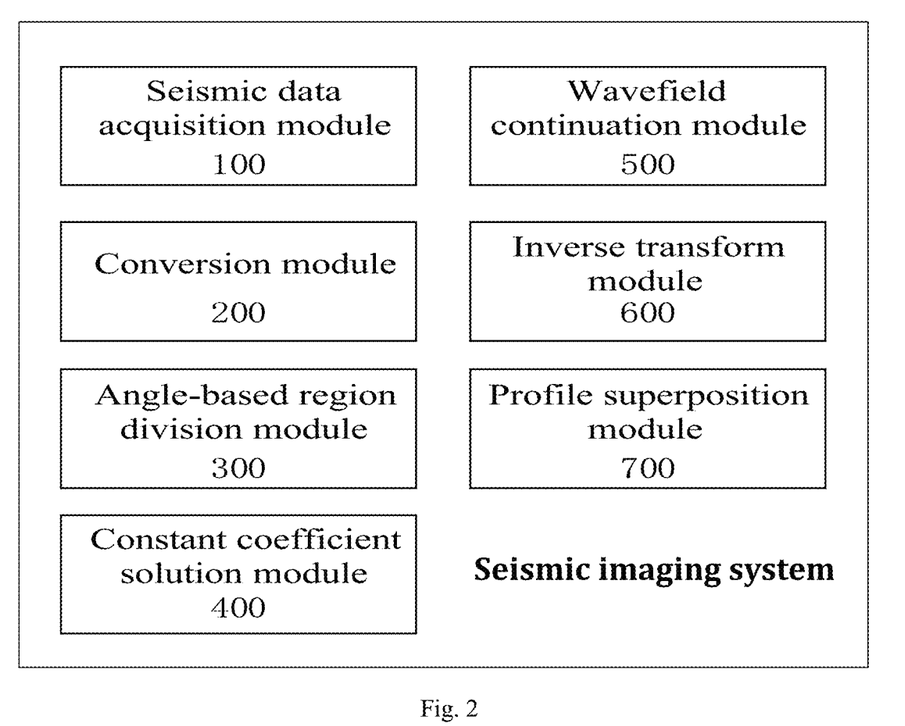
FIG. 2 is a block diagram of a seismic imaging system based on pre-stack high-angle fast Fourier transform (FFT) according to an embodiment of the present disclosure.

This application also provides a seismic imaging system based on pre-stack high-angle fast FFT, as shown in FIG. 2. The seismic imaging system includes a seismic data acquisition module 100, a conversion module 200, an angle-based region division module 300, a constant coefficient solution module 400, a wavefield continuation module 500, an inverse transform module 600, and a profile superposition module 700.

The seismic data acquisition module 100 is configured to acquire seismic data collected during seismic exploration, where the seismic data includes seismic source type, seismic source dominant frequency, location of a shot point, maximum tectonic angle, a set temporal sampling interval, a size of a given velocity model, and a spatial interval.

The conversion module 200 is configured to convert a common shot point gather to a common offset gather as a time-space domain common offset gather according to coordinates of the shot point and a receiver point in the seismic data, and convert time-space domain common offset seismic data in the time-space domain common offset gather from time-space domain to frequency-wavenumber domain by using Fourier transform to obtain frequency wavenumber domain common offset seismic data.

The angle-based region division module 300 is configured to calculate wave propagation angles of the grid points of the given velocity model at different frequencies based on the frequency wavenumber domain common offset seismic data, and divide an imaging region into a first region and a second region based on the wave propagation angles, where a wave propagation angle of the first region is smaller than that of the second region.

The constant coefficient solution module 400 is configured to solve optimized constant coefficients separately corresponding to the first region and the second region by a preset improved random walk algorithm.

The wavefield continuation module 500 is configured to substitute the optimized rational constant coefficients into a frequency wavenumber domain wavefield continuation equation, and perform frequency-division layer-by-layer wavefield continuation for a frequency wavenumber domain common offset gather to obtain imaging results at different depths and frequencies.

The inverse transform module 600 is configured to integrate the imaging results at different depths and frequencies to obtain integrated imaging results, and transform the integrated imaging results to a spatial domain by using inverse Fourier transform to obtain common offset imaging profiles.

The profile superposition module 700 is configured to perform superposition process on the common offset imaging profiles to obtain final imaging results.

It will be clear to those skilled in the art that for easy description, the specific working process of the system and the related description can be referred to the corresponding process in the aforementioned method embodiment, and will not be repeated here.

It should be noted that the above-mentioned embodiments are merely exemplary with respect to the division of functional modules of the seismic imaging system. In actual applications, the above-mentioned functions can be assigned by different functional modules as needed, that is, the modules or steps in the embodiments of the present disclosure can be decomposed or combined. For example, the modules of the above embodiment can be combined into one module, or further divided into multiple sub-modules to accomplish all or some of the functions described above. The names of the modules and steps involved in the embodiments of the present disclosure are merely for distinguishing the individual modules or steps, and are not intended to unduly limit the present disclosure.

This application further provides a device, which includes at least one processor and a memory in communication connection with the at least one processor, where the memory is configured to store an instruction executable by the at least one processor; and the instruction is configured to be executed by the at least one processor to implement the seismic imaging method based on pre-stack high-angle fast FFT.

This application also provides a computer-readable storage medium, where the computer-readable storage medium stores a computer instruction; and the computer instruction is configured to be executed by a computer to implement the seismic imaging method based on pre-stack high-angle fast FFT.

Figure 8:
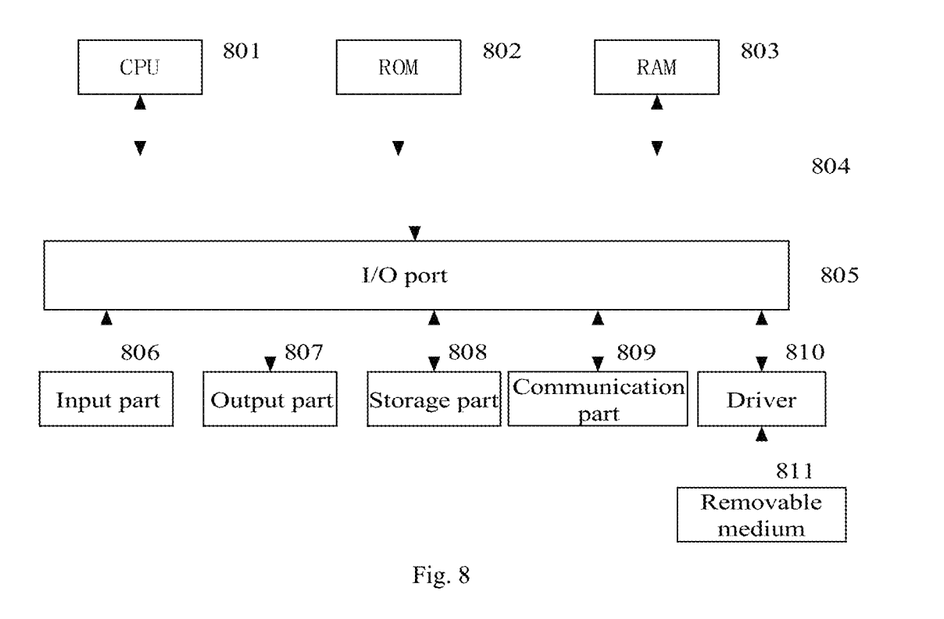
FIG. 8 is a structural diagram of a computer system suitable for implementing the seismic imaging method according to an embodiment of the present disclosure.

FIG. 8 schematically illustrates a structure of a computer system as the server suitable for implementing the seismic imaging system, method, and device of the present application. The server illustrated in FIG. 8 is only exemplary and shall not impose any limitation on the functionality and use scope of the embodiments of the present application.

As illustrated in FIG. 8, the computer system includes a central processing unit 801 (CPU), which can perform various appropriate actions and processes based on a program stored in read-only memory 802 (ROM), or a program loaded from a storage portion 808 into a random access memory 803 (RAM). RAM 803 also stores various programs and data required for system operation. The CPU 801, ROM 802, and RAM 803 are connected via bus 804. The input/output (I/O) interface 805 is also connected to bus 804.

The following components are connected to the I/O interface 805, including:
- an input component 806 including a keyboard and a mouse;
- an output component 807 including cathode ray tubes, a liquid crystal display, and a speaker;
- a storage component 808 including a hard disk; and
- a communication component 809 including a network interface card (such as a local area network and a modem). The communication component 809 is configured to perform communication processing via a network such as the Internet. The drive 810 is also connected to an I/O interface 805 as needed. A removable medium 811, such as disks, CDs, magnetic disks, semiconductor memory, etc., are mounted on the drive 810 as needed such that computer programs read from the removable medium 811 can be stored in the storage component 808.

In particular, the processes described above with reference to the flowchart may be implemented as a computer software program. For example, a computer program product is provided in an embodiment of the present disclosure, which includes a computer program carried on a computer-readable medium. The computer program includes program codes for implementing the method shown in the flowchart. In this embodiment, the computer program may be downloaded and installed from a network via the communication component 809, and/or installed from the removable medium 811. The computer program is executed by CPU 801 to perform the above-described functions as defined in the method of the present application. It should be noted that the computer-readable medium described above in the present application may be a computer-readable signal medium, a computer-readable storage medium, or a combination thereof. The computer-readable storage media may be, but are not limited to electrical, magnetic, optical, electromagnetic, infrared, or semiconductor systems, devices, components, or a combination thereof. More specifically, the computer-readable storage media may include, but are not limited to, electrically connected with one or more wires, portable computer disks, hard disks, RAM, ROM, erasable programmable read-only memory (EPROM or flash memory), optical fiber, portable compact disk read-only memory (CD-ROM), optical storage devices, magnetic memory devices, or a combination thereof. In this application, the computer-readable storage medium may be any tangible medium that contains or stores a program that can be used by or in combination with an instruction execution system, device, or component. The computer-readable signal medium may include a data signal contained in the baseband or propagated as part of a carrier wave that carries computer-readable program code. Such propagated data signals may include but are not limited to electromagnetic signals, optical signals, or a combination thereof. The computer-readable signal medium may also be any computer-readable medium other than a computer-readable storage medium that sends, propagates, or transmits a program that can be used by or in conjunction with an instruction execution system, device, or component. The program code contained on the computer-readable medium may be transmitted by any suitable medium, including but not limited to, wireless, wire, fiber optic cable, or a combination thereof.

Computer program codes for performing the operations of the present application may be written in one or more programming languages or combinations thereof, where the programming languages include object-oriented programming languages (such as Java, Smalltalk, and C++), and conventional procedural programming languages (such as C or similar programming languages). The program codes may be executed entirely or partially on the user's computer, as an independent software package, partially on a remote computer, or entirely on a remote computer or a server. When involving a remote computer, the remote computer may be connected to the user's computer via any kind of network, such as a local area network or a wide area network, or may be connected to an external computer (i.e., via the Internet by using an Internet service provider).

The flowcharts and block diagrams in the accompanying drawings illustrate possible implementations of the architecture, functionality, and operation of systems, methods, and computer program products provided in the above-mentioned embodiments of the present application. Each box in a flowchart or block diagram may represent a module, program segment, or portion of a code that contains one or more executable instructions for implementing a specified logical function. It should also be noted that in some implementations as replacements, the functions indicated in the boxes may also occur in a different order from that indicated in the accompanying drawings. For example, two boxes represented in sequence can actually be executed in substantially parallel, or in the opposite order, depending on the function involved. Notably, each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions The terms "first" and "second" are used to distinguish similar objects and are not intended to describe or indicate a particular order or sequence.

The term "includes" or any other variant is intended to cover non-exclusive inclusion such that a process, method, article, or apparatus/device that includes a series of elements includes not only those elements, but also other elements that are not explicitly listed or inherent to the process, method, article or apparatus/device.

The technical solution of the present disclosure has been described with reference to the preferred embodiments shown in the accompanying drawings. Nevertheless, it is readily understood by those skilled in the art that the scope of protection of the present disclosure is not limited to these specific embodiments. Equivalent changes or substitutions to the relevant technical features made by those skilled in the art without deviating from the principles of the present disclosure shall fall within the scope of protection of the present disclosure.

What is claimed is:

1. A seismic imaging method, comprising:
(S100) collecting seismic data comprising seismic source type, seismic source dominant frequency, location of a shot point, maximum tectonic angle, a set temporal sampling interval, a size of a velocity model, and a spatial interval;
(S200) extracting a common shot point gather from the seismic data; converting the common shot point gather to a time-space domain common offset gather according to the location of the shot point and a location of a receiver point; and converting time-space domain common offset seismic data in the time-space domain common offset gather from time-space domain to frequency-wavenumber domain by using Fourier transform to obtain frequency-wavenumber domain common offset seismic data;
(S300) calculating a plurality of wave propagation angles of a plurality of grid points of the velocity model based on the frequency-wavenumber domain common offset seismic data through the following equation:

$$\theta = \arctan\left(\left|\frac{\partial p}{\partial x}\right| / \left|\frac{\partial p}{\partial z}\right|\right),$$

wherein $\theta$ represents the wave propagation angles; $\partial p/\partial x$ represents a partial derivative of a seismic wavefield in x direction; and $\partial p/\partial z$ represents a partial derivative of the seismic wavefield in z direction; and
dividing an imaging region into a first region and a second region based on the plurality of wave propagation angles, wherein a wave propagation angle of the first region is smaller than a wave propagation angle of the second region;
(S400) calculating a plurality of optimized constant coefficients corresponding to the first region and the second region according to the following equation:

$$J = \int_0^1 \int_0^\varphi \left(\sqrt{1 - \overline{k_x}^2} + n - 1 + (n-1)\frac{c\overline{k_x}^2}{a + b\overline{k_x}^2} - \sqrt{n^2 - \overline{k_x}^2}\right)^2 d\theta dn;$$

wherein J is an objective function; $\theta$ represents the wave propagation angle; n is a medium refractive index; a, b and c represent the plurality of optimized constant coefficients; $k_x$ represents wavenumber in x direction; $\overline{k_x}$ represents normalized wavenumber in x direction, and $\overline{k_x} = k_x/k_0$; $k_0$ represents wavenumber based on background velocity; and $\varphi$ is a set maximum imaging angle;
(S500) constructing a rational function-approximation dispersion relation based on heterogeneity of a real underground medium; and substituting the rational function-approximation dispersion relation into a frequency-wavenumber domain Fourier wavefield continuation fundamental equation to obtain a frequency-wavenumber domain wavefield continuation equation, expressed as:

$$P(k_x, z + \Delta z) = \left\{ \begin{array}{l} (1-\alpha)\exp[ik_0\Delta z(n-1)] + \\ \alpha\exp[ik_0\Delta z(2n-2)] \end{array} \right\} p(k_x, z)\exp(ik_z\Delta z);$$

wherein $P(k_x, z+\Delta z)$ represents wavefield information at a depth of $z+\Delta z$; $k_z$ represents wavenumber in z direction; $p(k_x,z)$ represents wavefield information at a depth of z; $\alpha$ is an intermediate parameter variable, represented by $$\alpha = \frac{c\overline{k_x}^2}{a + b\overline{k_x}^2};$$

i represents an imaginary number; and $\Delta z$ represents a spatial sampling interval along a depth direction; and
substituting the plurality of optimized constant coefficients obtained in step (S400) into the intermediate parameter variable $\alpha$ of the frequency-wavenumber domain wavefield continuation equation, and processing the frequency-wavenumber domain common offset seismic data by using the frequency-wavenumber domain wavefield continuation equation thereby obtaining a plurality of images at different depths and frequencies;
(S600) integrating the plurality of images to obtain a plurality of integrated images; and transforming the plurality of integrated images to a spatial domain by using inverse Fourier transform to obtain a plurality of common offset imaging profiles; and
(S700) superposing the plurality of common offset imaging profiles to obtain a seismic image.

2. The seismic imaging method of claim 1, wherein in step (S300), the dividing an imaging region into a first region and a second region based on the plurality of wave propagation angles comprises:
if a wave propagation angle is less than a set angle threshold, classifying a corresponding seismic imaging region as the first region, otherwise, classifying a corresponding seismic imaging region as the second region.

3. The seismic imaging method of claim 1, wherein the rational function-approximation dispersion relation is expressed as:

$$\overline{k_z} = \sqrt{1 - \overline{k_x}^2} + (n-1) + (n-1)\left(\frac{c\overline{k_x}^2}{a + b\overline{k_x}^2}\right);$$

wherein $\overline{k_z}$ represents normalized wavenumber in z direction.

4. A seismic imaging device, comprising:
at least one processor; and
a memory in communication connection with the at least one processor;
wherein the memory is configured to store an instruction executable by the at least one processor; and the instruction is configured to be executed by the at least one processor to cause the seismic imaging device to perform the seismic imaging method of claim 1.

* * * * *